United States Patent [19]
Chang et al.

[11] Patent Number: 5,867,451
[45] Date of Patent: Feb. 2, 1999

[54] SOLID MARINE SEISMIC CABLE ASSEMBLY

[75] Inventors: Win Chang, Houston; Algernon S. Badger, Bernard; Richard H. Luce, Katy; David S. Lamance, Wallis; Hoan P. Nguyen, Houston; Christopher A. Neighbors, Alvin, all of Tex.

[73] Assignee: Input/Output, Inc., Stafford, Tex.

[21] Appl. No.: 784,484

[22] Filed: Jan. 17, 1997

[51] Int. Cl.$^6$ .............................. G01V 1/38; H04R 11/00
[52] U.S. Cl. ...................... 367/165; 367/20; 367/173; 367/177; 174/101.5
[58] Field of Search .................... 367/20, 155, 165, 367/173, 177; 174/101.5

[56] References Cited

U.S. PATENT DOCUMENTS

| | | | |
|---|---|---|---|
| 2,424,388 | 7/1947 | Duna | 174/101.5 |
| 3,675,193 | 7/1972 | Davis . | |
| 3,781,778 | 12/1973 | Sawin et al. | 367/20 |
| 3,900,543 | 8/1975 | Davis | 174/101.5 |
| 4,300,218 | 11/1981 | Kruka et al. . | |
| 4,491,939 | 1/1985 | Carpenter . | |
| 4,510,588 | 4/1985 | Kruka et al. | 367/165 |
| 4,689,777 | 8/1987 | Roever | 367/165 |
| 4,809,243 | 2/1989 | Bledsoe et al. | 367/154 |
| 4,818,822 | 4/1989 | Yahraus . | |
| 4,920,523 | 4/1990 | Kruka et al. . | |
| 5,251,182 | 10/1993 | Carpenter | 367/20 |
| 5,265,066 | 11/1993 | Svenning et al. | 367/20 |
| 5,521,885 | 5/1996 | Harvey . | |
| 5,600,608 | 2/1997 | Weiss et al. . | |

*Primary Examiner*—Nelson Moskowitz
*Attorney, Agent, or Firm*—Tim Headley; Haynes and Boone, L.L.P.

[57] ABSTRACT

A solid marine seismic cable assembly includes a cable, hydrophone housings, a buoyant filler, and an outer protective jacket. The cable includes a load-bearing fiber bundle, data-transmitting wires, power conductors, optical fibers, and a protective sheath. The data-transmitting wires, power conductors, and optical fibers surround the load-bearing fiber bundle. The protective sheath surrounds the assembly of the data-transmitting wires, power conductors, optical fibers, and the load-bearing fiber bundle. The hydrophone housings affix around the cable in a spaced-apart relationship. Each hydrophone housing includes a hydrophone module, and each hydrophone module contains a hydrophone. The buoyant filler surrounds the cable, and separates the hydrophone housings. The outer protective jacket surrounds the hydrophone housings and the buoyant filler, enclosing the cable assembly.

20 Claims, 5 Drawing Sheets

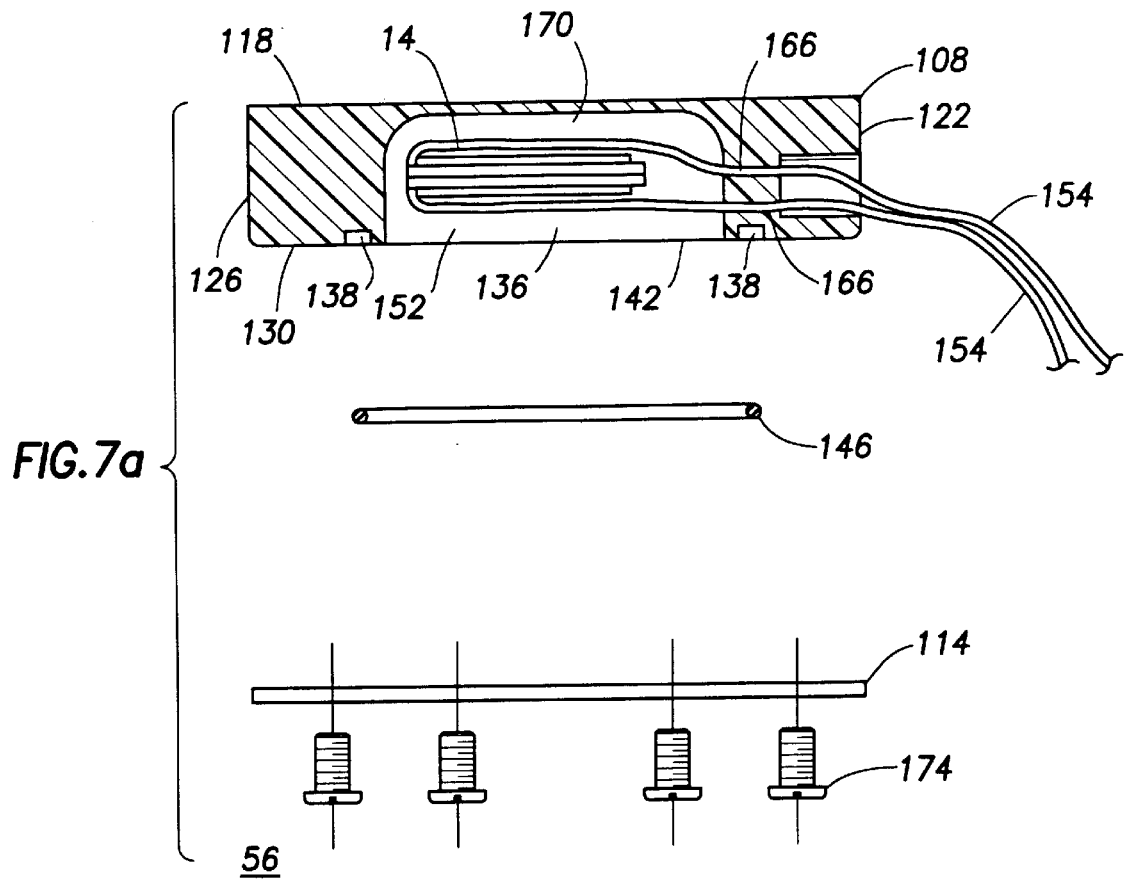
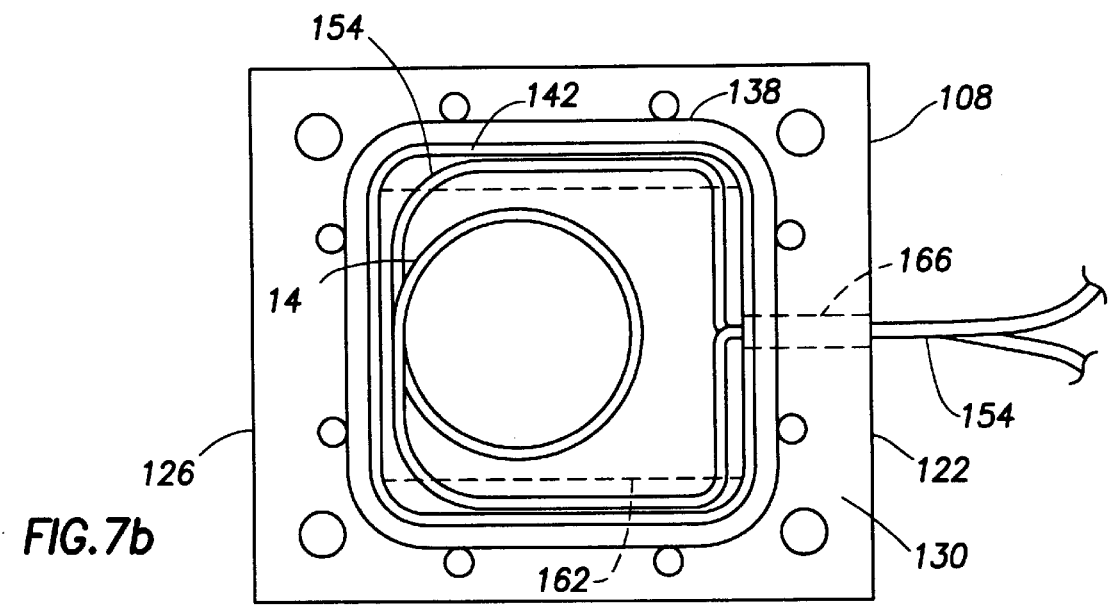
FIG. 7a
FIG. 7b

SOLID MARINE SEISMIC CABLE ASSEMBLY

BACKGROUND OF THE INVENTION

This invention relates to marine seismic cables, and, more particularly, to a towed seismic cable which flexible solid materials, disposed within the cable, buoyantly support.

For many years, the marine seismic exploration industry has relied on fluid-filled seismic cables. Marine seismic cables are one of the most critical components aboard today's seismic exploration vessels, and have a direct affect on the accuracy of the results which researchers and technicians obtain. The amount and type of fluid in oil-filled cables must be adjusted dependent on changes in water temperature and/or salinity. Also, oil-filled cables are prone to leakage. The outer jacket of the seismic cables of the prior art is prone to rupture or tearing. This is particularly undesirable because this exposes the internal electrical components to seawater, and disrupts the buoyancy of the cable.

Some of the hazards which seismic cables face include underwater obstructions, fishing vessels, and sea animals. These hazards can sever cables, which may then sink, and, consequently, cause significant downtime and lost efficiencies.

U.S. Pat. Nos. 5,089,668, 5,141,796, and 5,471,436 disclose the use of a buoyant material to permit solid or semi-solid composition of a seismic cable. However, in these cases, the positioning or housing of hydrophones is not discussed.

The industry needs a seismic cable which is streamlined, buoyant even when the jacket ruptures, durable, and which requires little maintenance. The industry needs a seismic cable which requires less change-over time to accommodate different marine environments. The industry needs a seismic cable which minimizes hydrophone noise generated by the relative motion of cable components.

SUMMARY OF THE INVENTION

The present invention solves the foregoing problems, and achieves technical advances, with a solid marine seismic cable assembly and a method of manufacturing the same, the cable assembly including a cable, hydrophone housings, a buoyant filler, and an outer protective jacket.

The cable includes a load-bearing fiber bundle, data-transmitting wires, power conductors, optical fibers, and a protective sheath The data-transmitting wires, power conductors, and optical fibers surround the load-bearing fiber bundle. The protective sheath surrounds the assembly of the data-transmitting wires, power conductors, and optical fibers, and the load-bearing fiber bundle. The hydrophone housings clamp around the cable in a spaced-apart relationship. Each hydrophone housing includes a hydrophone module or hydrophone cap, and each hydrophone cap contains a hydrophone. The buoyant filler surrounds the cable, and separates the hydrophone housings. The outer protective jacket surrounds the hydrophone housings and the buoyant filler, enclosing the cable assembly.

In another feature, the buoyant filler substantially fills regions being bounded by an outermost cylindrical surface of the cable and an imaginary cylindrical surface, which extends between outermost cylindrical surfaces of adjacent hydrophone housings.

In another feature, the protective jacket shields the cable assembly against penetration by water.

In another feature, the buoyant filler is a split tube which is a composite mixture of thermoplastic elastomer and glass microspheres, the composite mixture having a specific gravity of from 0.76 to 0.82.

In another feature, the protective jacket is a composite jacket having an internal layer of polyurethane and an external layer of polyvinyl chloride.

In another feature, each hydrophone housing further includes a first portion and a second portion. One of the portions has a receiving recess. The hydrophone cap installs on this receiving recess. The portions each include a contact surface which contacts the cable when the mounts fasten around the cable. The portions clamp around the cable via screws. The contact surface includes raised bosses which securely grip the cable by increasing contact pressure per unit area in a region of contact between the raised bosses and the cable.

In another feature, the portion which contains a receiving recess further includes a wire-clearance recess and a wire passageway, between the receiving recess and the wire-clearance recess.

In another feature, an outer cylindrical surface of each hydrophone cap is flush with an outer cylindrical surface of each hydrophone housing.

In another feature, the hydrophone cap further includes a cavity and a cover. The cavity has a perimetrical edge which the intersection of a receiving surface and the cavity defines. The cavity receives a hydrophone assembly. The cover sealingly fits over the cavity and the channel.

In another feature, the hydrophone is potted in the cavity with a potting sealant. The potting sealant fills substantially all the space in the cavity not occupied by the hydrophone.

In another feature, the cover is a metal plate.

In another feature, the hydrophone assembly includes the hydrophone, a baffle material, and lead wires. The hydrophone is surrounded by the baffle material. The lead wires electrically connect to the hydrophone. Oil fills the cavity and immerses the hydrophone assembly.

In another feature, the baffle material is an open cell foam structure.

In another feature, a hydrophone frame supports the hydrophone within the potting sealant.

In another feature, the load-bearing fiber bundle includes a thin cover enclosing a counter-helix-wrapped high-strength fiber.

An object of the invention is to provide a continuous protective jacket in a solid marine seismic cable assembly, thus making the cable assembly streamlined. This minimizes noise by minimizing uneven surfaces which disrupt laminar flow around the cable assembly.

Another object of the invention is to maintain buoyancy to the cable assembly, even when the protective jacket ruptures.

BRIEF DESCRIPTION OF THE DRAWINGS

FIG. 3 is a cross-sectional view of the load-bearing fiber bundle of the preferred embodiment.

FIG. 4 is a cross-sectional view of the cable of the preferred embodiment.

FIG. 7a is an exploded cross-sectional view of an alternate embodiment of the hydrophone cap.

FIG. 7b is plan view of the alternate embodiment of FIG. 7a.

DETAILED DESCRIPTION OF THE PREFERRED EMBODIMENT

Figure 1:
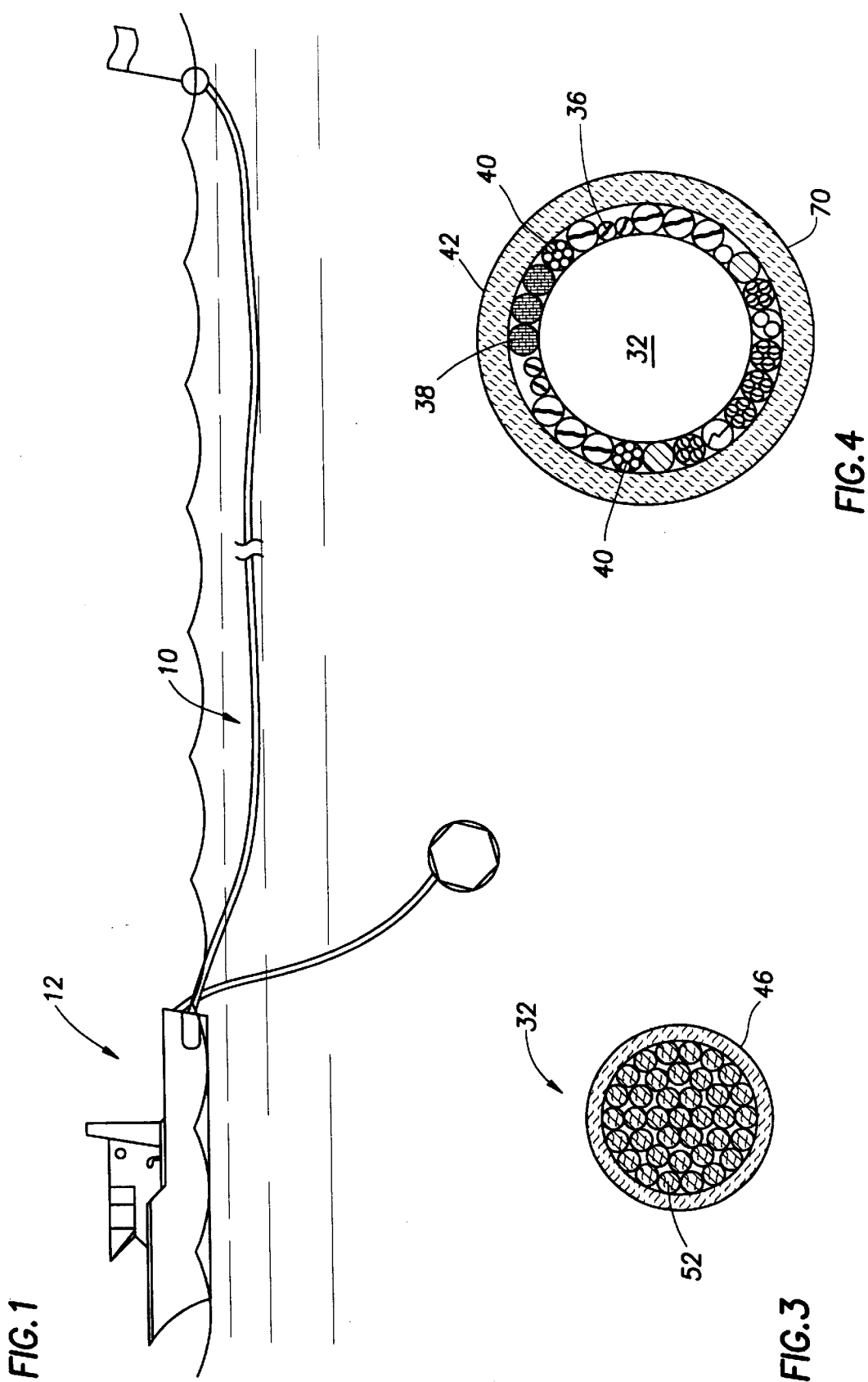
FIG. 1 is a general overall view of an illustrative seismic cable assembly towed behind a boat, the assembly containing many hydrophones.

Referring to FIG. 1, a boat 12 tows a solid marine seismic cable assembly 10. The cable assembly 10 contains hydrophones 14 (shown in FIG. 6).

Figure 2:
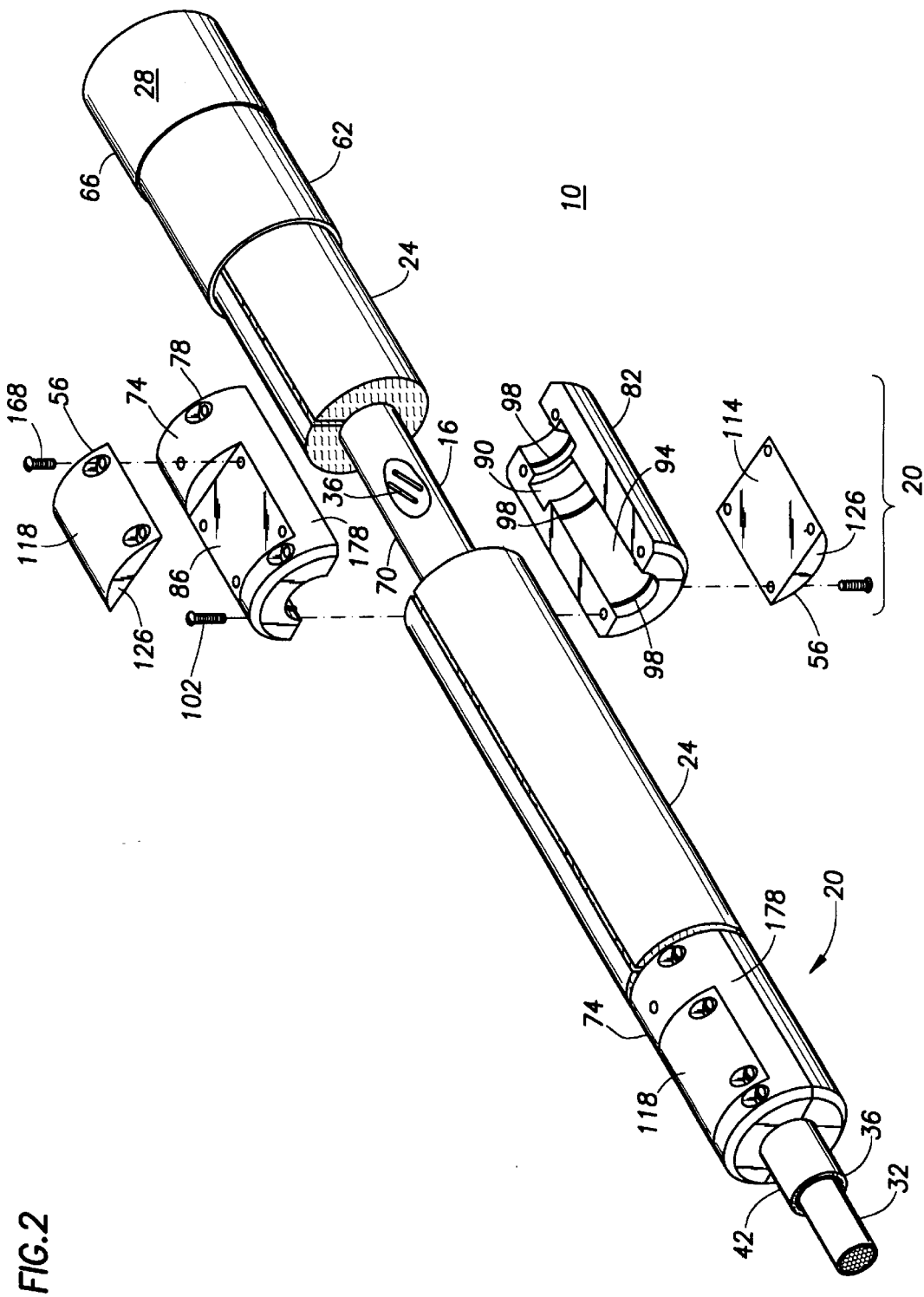
FIG. 2 is an exploded view of the preferred embodiment of the solid marine seismic cable assembly.

Referring to FIG. 2, the cable assembly 10 includes a cable 16, hydrophone housings 20, a buoyant filler 24, and an outer protective jacket 28. The cable 16 includes a load-bearing fiber bundle 32, data-transmitting wires 36, power conductors 38, and optical fibers 40 encased in stainless steel tubes, and a clear, protective sheath 42. The optical fibers 40 transmit telemetry data.

Referring to FIG. 3, the load-bearing fiber bundle 32 includes a thin cover 46 enclosing a counter-helix-wrapped high-strength fiber 52. The cover 46 protects the fiber 52 from abrasion by the data-transmitting wires 36, power conductors 38, and optical fibers 40 (shown in FIG. 4). The fiber 52 is "KEVLAR 29", available from E. I. Du Pont, located in Wilmington, Del. Referring to FIG. 4, the data-transmitting wires 36, power conductors 38, and optical fibers 40 surround the load-bearing fiber bundle 32. The protective sheath 42 surrounds the assembly of these four items.

Referring again to FIG. 2, the hydrophone housings 20 clamp around the cable 16, in a spaced-apart relationship. Each hydrophone housing 20 includes a hydrophone module or hydrophone cap 56, and each hydrophone cap contains a hydrophone 14 (as shown in FIGS. 6 and 7). The buoyant filler 24 surrounds the cable 16 between the hydrophone housings 20.

The outer protective jacket 28 surrounds the hydrophone housings 20 and the buoyant filler 24, The protective jacket 28 is a composite jacket having an internal layer 62 of polyurethane and an external layer 66 of polyvinyl chloride. The protective jacket 28 is available from Bayland Corporation of Manvel, Tex., in a coextruded form. The protective jacket 28 seals the cable assembly 10 from water.

The buoyant filler 24 is a split tube which is a composite mixture of thermoplastic elastomer and glass microspheres, the composite mixture having a specific gravity of from 0.76 to 0.82. The elastomer is "VISTA-FLEX", Part No. 9601-74, available from Advanced Elastomers, Inc. of Akon, Ohio. The glass microspheres are "SCOTCHLITE" brand, Part No. B38/4000, available from 3M Corporation of St. Paul, Minn. The buoyant filler 24 substantially fills regions being bounded by an outermost cylindrical surface 70 of the cable 16 and an imaginary cylindrical surface, which emends between outermost cylindrical surfaces 74 of adjacent hydrophone housings 20. An adhesive (not shown) applied along a split in the split tube bonds the buoyant filler 24 around the cable 16.

Each hydrophone housing 20 further includes a top portion or top mount 78 and a bottom portion or bottom mount 82. Each mount 78 and 82 has a wire-clearance recess 90. Each mount 78 has a receiving recess 86, and the mount 82 may optionally have a receiving recess 86. The mounts 78 and 82 each include a contact surface 94 which contacts the cable 16 when the mounts fasten around the cable. The contact surface 94 includes raised ribs or bosses 98 (most clearly shown in FIG. 6). The mounts 78 and 82 clamp around the cable 16 via screws 102. The bosses 98 securely grip the cable 16 by increasing contact pressure per unit area between the bosses and the cable.

The hydrophone housing 20 is fabricated from a high strength, light weight, rigid, injection-moldable, composite polymer of about 40% by weight glass fiber fill in a polyurethane resin. Suitable polymers include "ISOPLAST", Part. No. 800-441-4DOW, available from DOW Chemical Company of Midland, Mich., or "ESTALOC", available from B. F. Goodrich Corporation of Jacksonville, Fla.

Figure 5:
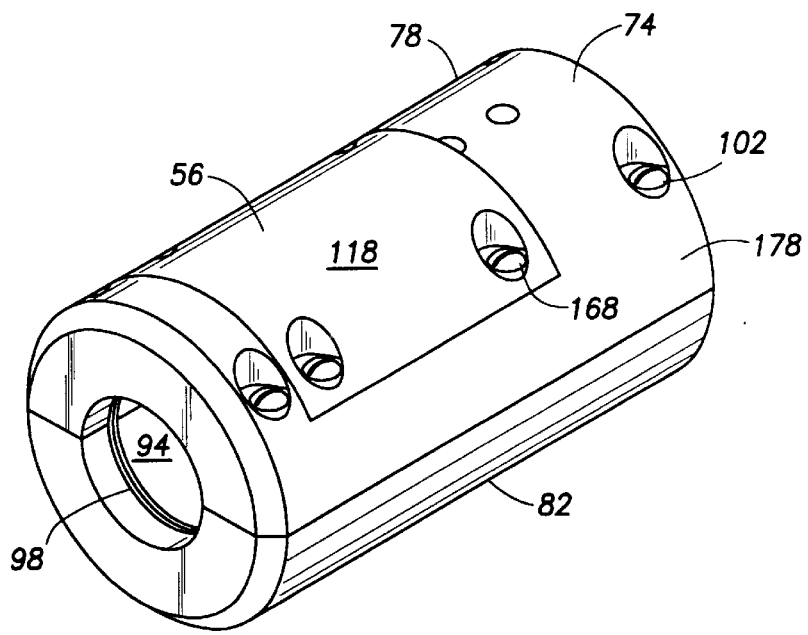
FIG. 5 is a perspective view of a hydrophone housing of the preferred embodiment.
Figure 6A:
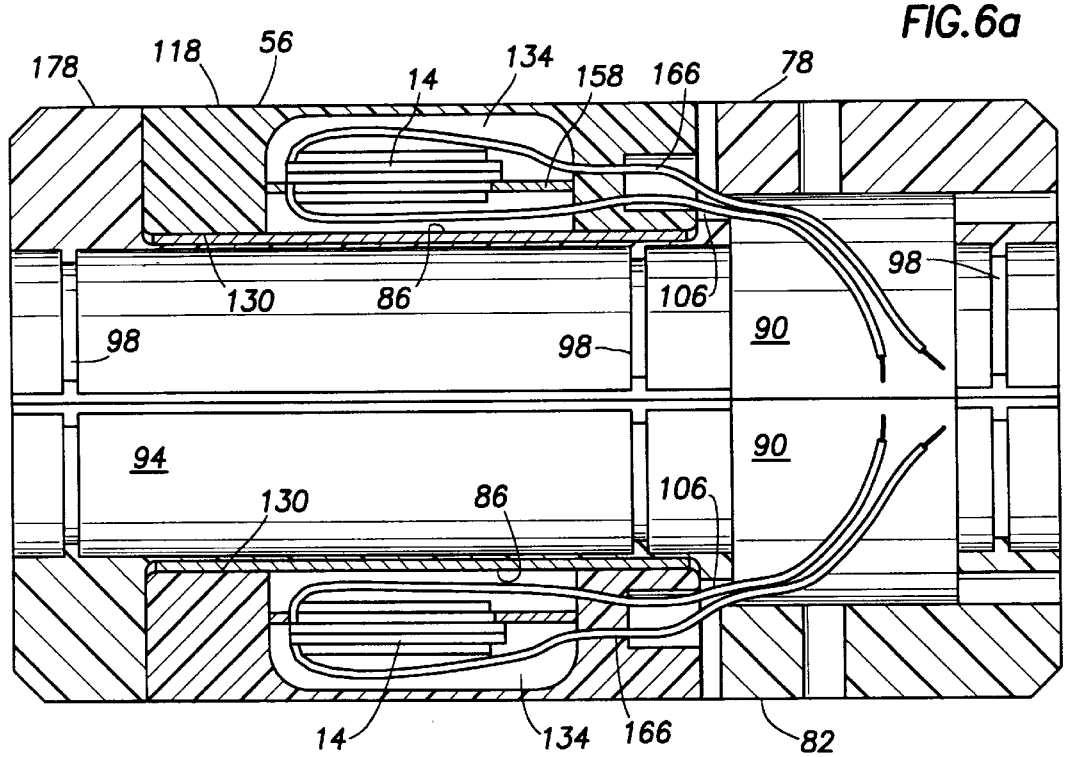
FIG. 6a is a cross-sectional view of a hydrophone housing of the preferred embodiment.
Figure 6B:
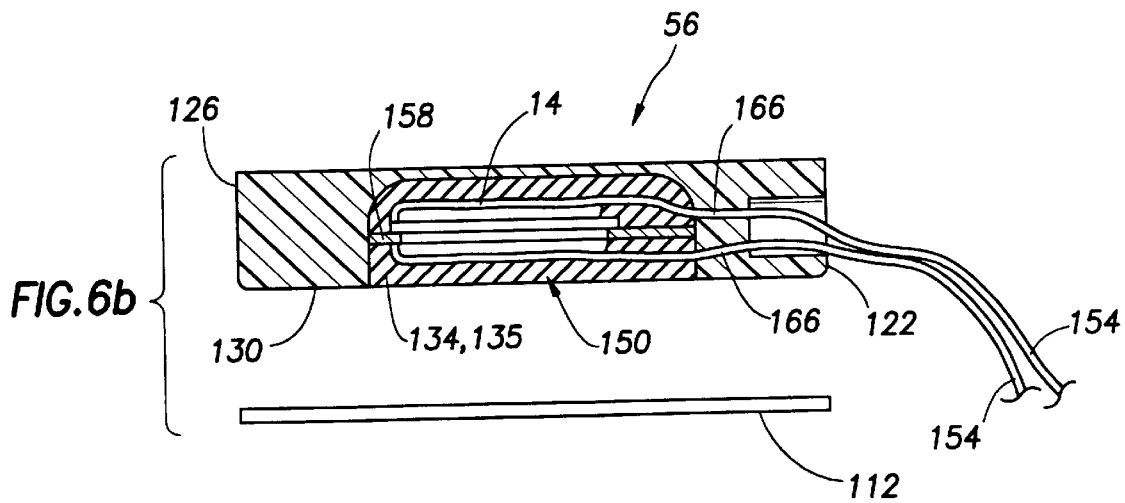
FIG. 6b is a cross-sectional view of a hydrophone cap of the preferred embodiment.
Figure 6C:
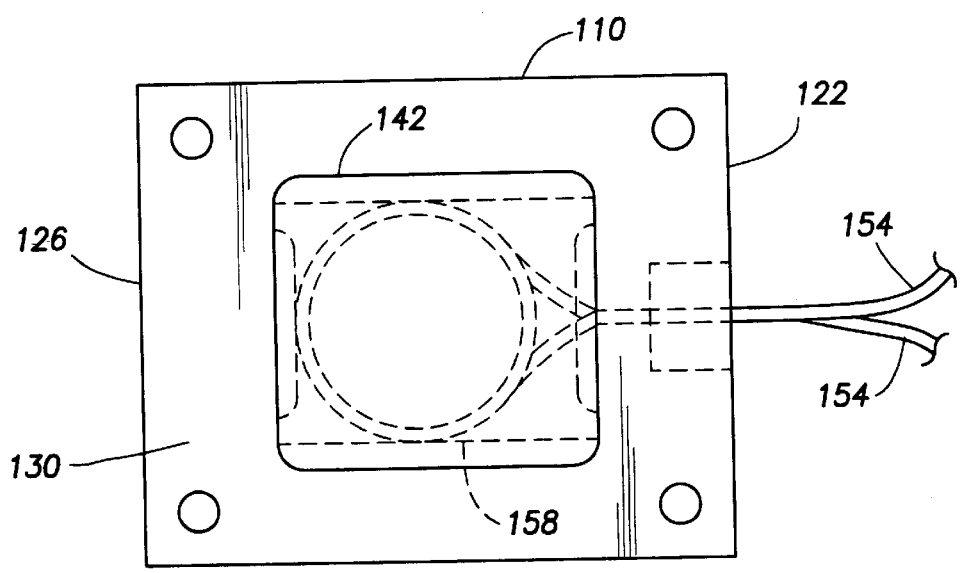
FIG. 6c is a plan view of the hydrophone cap of the preferred embodiment.

Referring to FIG. 6a, the mounts 78 and 82 further include a wire passageway 106 between the receiving recess 86 and the wire-clearance recess 90. Referring now to FIGS. 6b and 6c, the hydrophone cap 56 includes a block 110 and an isolator 112. The block 110 has an outer curved or cylindrical surface 118 (as shown in FIGS. 2 and 5), end surfaces 122 and 126, and a receiving surface 130. The receiving surface 130 intersects the cylindrical surface 118. The block 110 has a cavity 134. The cavity 134 has a perimetrical edge 142 which the intersection of the cavity and the receiving surface 130 defines.

A hydrophone assembly 150 installs in the cavity 134. The hydrophone assembly 150 includes a hydrophone 14, lead wires 154, and a hydrophone frame 158. The hydrophone is a "PRESEIS" brand hydrophone, available from Input/Output, Inc., of Alvin, Tex. The hydrophone 14 mounts in the hydrophone frame 158. The hydrophone frame 158 supports the hydrophone 14 within the cavity 134.

Lead wires 154 electrically connect to the hydrophone 14. The lead wires 154 pass through apertures 166 to the exterior of the hydrophone cap 56. A sealant (not shown) seals the apertures 166.

The hydrophone 14 is potted in the cavity 134 with a potting sealant 135. The preferred potting sealant is "POLYSET", Part No. PC3062, available from Polyset Company in Mechanicville, N.Y. The potting sealant 135 fills substantially all the space in the cavity 134 not occupied by the hydrophone 14. An isolator 112 fits between the cap 56 and the receiving recess 86, and is sealed to the filled cavity 134 and the receiving recess 86 with a gasket compound such as "PERMATE", available from Permatex Industrial Division, Rock Hill, Conn., in order to eliminate any voids between the isolator 112 and the potting sealant 135 and the receiving recess 86.

Referring to FIGS. 5 and 6a, screws 168 capture the isolator 112 upon assembly of the cap 56 to the receiving recess 86 (depicted in FIG. 1) on the mounts 78 or 82. The screws 168 pass through the hydrophone cap 56 and the isolator 112, into the mounts 78 or 82. The isolator 112 is rigid and has a high Modulus of Elasticity. The isolator 112 is preferably made from a 0.035 inch thick series 300 stainless steel plate.

The lead wires 154 connect to the appropriate data-transmitting wires 36 of the cable 16, via splices (not shown). The wire-clearance recess 90 contains the splices. The outer cylindrical surface 118 of each hydrophone cap 56 is flush with an outer cylindrical surface 178 of each hydrophone housing 20. The hydrophone mounts may use a single hydrophone as shown in FIG. 5, or may support two hydrophones, as shown in FIG. 6a, or more, as desired.

Referring now to FIGS. 7a and 7b, in an alternate embodiment the hydrophone cap 56 includes a block 108 and a cover 114. The block 108 has an outer curved or cylindrical surface 118 (as shown in FIGS. 2 and 5), end surfaces 122 and 126, and a receiving surface 130. The receiving surface 130 intersects the cylindrical surface 118, The block 108 has a cavity 136 and a gasket-receiving channel 138. The cavity 136 has a perimetrical edge 142 which the intersection of the cavity and a receiving surface 130 defines. The channel 138 circumscribes the perimetrical edge 142. The channel 138 contains a gasket 146.

A hydrophone assembly 152 installs in the cavity 136. The hydrophone assembly 152 includes a hydrophone 14, lead wires 154, and a baffle material 162. The baffle material 162 positions the hydrophone 14 centrally in the cavity 136. The baffle material 162 is an open cell foam structure.

Lead wires 154 electrically connect to the hydrophone 14. The lead wires 154 pass through apertures 166 to the exterior of the hydrophone cap 56. A sealant (not shown) seals the apertures 166. An oil 170 fills the cavity 134 and immerses the hydrophone assembly 152. The oil 170 is a liquid which is acoustically transparent and which has a density similar to that of water. Suitable oils include castor oil, "ISOPAR H", available from Exxon Corporation of Houston, Tex., and "PARATHERM NF", available from Paratherm Corporation of Conshohocken, Pa. The cover 114 sealingly fits over the cavity 134 and the channel 138. The cover 114 is rigid and has a high Modulus of Elasticity. The cover 114 is preferrably made from a 0.035 inch thick series 300 stainless steel plate. Pan-head fasteners 174 securely attach the cover 114 to the block 108.

Referring to FIGS. 5 and 6, the hydrophone cap 56 installs in the receiving recess 86 (depicted in FIG. 1) of the mounts 78 and 82. The screws 168 fasten the hydrophone cap 56 to the mounts 78 and 82. The lead wires 154 connect to the appropriate data-transmitting wires 36 of the cable 16, via splices (not shown). The wire-clearance recess 90 contains the splices. The outer cylindrical surface 118 of each hydrophone cap 56 is flush with an outer cylindrical surface 178 of each hydrophone housing 20.

Referring again to FIG. 2, a method of making the marine seismic cable 10 includes the following steps: surrounding the load-bearing fiber bundle 32 with data-transmitting wires 36, power conductors 38, and optical fibers 40 (shown in FIG. 4); enclosing the load-bearing fiber bundle 32, the data-transmitting wires 36, the power conductors 38, and the optical fibers 40 with the protective sheath 42; clamping hydrophone housings 20 along the cable 16; electrically connecting the hydrophone 14 in each hydrophone housing 20 to the appropriate data-transmitting wires 36, via a splice; installing the tubular, buoyant filler 24 between the hydrophone housings 20 and around the cable 16; and enclosing the cable 16, the hydrophone housings 20, and the buoyant filler 24 with the protective jacket 28.

Referring again to FIGS. 6a, 6b, and 6c, a method of making the hydrophone cap 56 for the cable assembly 10 includes the following steps: forming the block 110 having the cylindrical surface 118 and the cavity 134, which is disposed in the receiving surface 130 of the block 110; mounting the hydrophone 14, to which lead wires 154 attach, in the hydrophone frame 158, thus creating the hydrophone assembly 150; installing the hydrophone assembly 150 in the cavity 134; passing the lead wires 154 out of the cavity 134; sealing the cavity 134 around the lead wires 154; potting the hydrophone assembly 150 in the cavity 134 with potting sealant 135; and sealingly mounting the isolator 112 to the potted assembly and the receiving recess 86, using a gasket compound such as "PERMATEX".

Referring again to FIGS. 7a and 7b, an alternate method of making the alternate embodiment of the hydrophone cap 56 for the cable assembly 10 includes the following steps: forming the block 108 having the cylindrical surface 118 and the cavity 136, which is disposed in the receiving surface 130 of the block 110; mounting the hydrophone 14, to which lead wires 154 attach, in the baffle material 162, thus creating the hydrophone assembly 152; installing the hydrophone assembly 152 in the cavity 136; passing the lead wires 154 out of the cavity 136; sealing the cavity 136 around the lead wires 154; and mounting the cover 114 over the cavity 136.

In operation, the cable assembly 10 connects to a data recording unit (not shown) on board the boat 12. The cable assembly 10 unwinds from a spool (not shown) on the boat 12, and lowers into the water. The hydrophone 14 receives acoustic waves which pass through the protective jacket 28, the outer cylindrical surface 118 of the hydrophone cap 56, and the potting sealant 135 or the oil 170. The hydrophone transduces these acoustic waves into electrical signals which transmit through the lead wires 164, the splice, and the data-transmitting wires 36, to streamer electronic modules (not shown), which then send the data via telemetry over the optical fibers 40 to the data recording unit on the boat 12.

An advantage is that the protective jacket 28 is continuous along the length of the cable assembly 10, thus making the cable assembly streamlined. This minimizes noise by minimizing uneven surfaces which disrupt laminar flow around the cable assembly 10.

Another advantage is that the cable assembly 10 is buoyant even when the protective jacket 28 ruptures.

Another advantage is that the cable assembly 10 is durable, and requires little maintenance.

Another advantage is that the cable assembly 10 requires minimum change-over time to accommodate different marine environments because the buoyancy of the solid-filled cable is less affected by water temperature, as compared to a fluid-filled cable.

Another advantage is that the cable assembly 10 provides for placement of the hydrophone 14 near the external surface of the cable assembly, thus improving reception and minimizing noise which relative motion of components within the cable assembly generates.

Another advantage is that the isolator 112 significantly improves the sensitivity of the hydrophone 14. The isolator 112 also compensates for a thin wall between the receiving recess 86 and the contact surface 94. In addition, the isolator 112 reduces noise originating from within the cable 16 or inside the cable assembly 10.

Another advantage is that the baffle material 162 isolates the hydrophone 14 from the block 110 and the cover 114.

Another advantage is that, due to its thin profile, the hydrophone cap 56 may be used separately from the hydrophone housings 20, such as on the hull of the boat 12.

In an alternate embodiment, the baffle material 162 retains the hydrophone 14 against relative motion within the cavity 134, eliminating the need for the hydrophone frame 158.

In another alternate embodiment, as depicted in FIG. 4, a method of making the solid marine seismic cable assembly 10 includes the steps of: surrounding the load-bearing fiber bundle 32 with the data-transmitting wires 36, the power conductors 38, and the optical fibers 40; enclosing the load-bearing fiber bundle 32, the data-transmitting wires 36, the power conductors 38, and the optical fibers 40 with the protective sheath 42; clamping the hydrophone housings 20 along the cable 16; installing the buoyant filler 24 between the hydrophone housings 20 and around the cable 16; electrically connecting the hydrophone 14, in each hydrophone housing 20, to the appropriate data-transmitting wires 36; and enclosing the cable 16, the hydrophone housings 20, and the buoyant filler 24 within the protective jacket 28.

In another alternate embodiment, the receiving recess 86 on the mounts 78 and 82 is elongated along the longitudinal axis of the housing 20, so as to accommodate two hydrophone caps 56. The lead wires 154 from the two hydrophone caps 56 share a common wire-clearance recess 90 and a wire passageway 106.

In another alternate embodiment, the buoyant filler 24 fastens around the cable 16 with a mechanical fastener (not shown).

Although an illustrative embodiment of the invention has been shown and described, other modifications, changes and substitutions are intended in the foregoing disclosure. Accordingly, it is appropriate that the appended claims be construed broadly and consistent with the scope of the invention.

What is claimed is:

1. A solid marine seismic cable assembly, comprising:
   a. a cable including data-transmitting wires; and
   b. hydrophone housings clamped around the cable in a spaced-apart relationship, each hydrophone housing including:
      i. a mount;
      ii. a cap mounted on the mount, the cap having a hydrophone cavity for containing a hydrophone; and
      iii. a wire-clearance recess within the mount, the wire-clearance recess radially and laterally displaced from the cap, and being of sufficient size for receiving connections between hydrophone lead wires and the data-transmitting wires.

2. A solid marine seismic cable assembly, comprising:
   a. a cable including data-transmitting wires; and
   b. hydrophone housings clamped around the cable in a spaced-apart relationship, each hydrophone housing including:
      i. a mount; the mount containing within itself a hydrophone cavity for containing a hydrophone; and
      ii. a wire-clearance recess within the mount, the wire-clearance recess radially and laterally displaced from the hydrophone cavity, and being of sufficient size for receiving connections between hydrophone lead wires and the data-transmitting wires.

3. A method of making a solid marine seismic cable assembly, using hydrophone housings, each housing having a cavity within the housing, the cavity containing a hydrophone, each housing also having within itself a wire-clearance recess laterally displaced from the cavity, and of sufficient size to receive connections between hydrophone lead wires and data-transmitting wires, the method comprising the steps of:
   a. enclosing the data-transmitting wires with a protective sheath, thus creating a cable;
   b. connecting, within the wire-clearance recess, the hydrophone lead wires to the data-transmitting wires; and
   c. affixing the hydrophone housings along the cable.

4. A solid marine seismic cable assembly, comprising:
   a. a cable including:
      i. a load-bearing fiber bundle;
      ii. data-transmitting wires; and
      iii. a protective sheath surrounding the data-transmitting wires and the load-bearing fiber bundle;
   b. hydrophone housings clamped around the cable in a spaced-apart relationship, each hydrophone housing including:
      i. a cap having a hydrophone cavity for containing a hydrophone;
      ii. a mount radially displaced from the can and contiguous with the cap; and
      iii. a wire-clearance recess within the mount, laterally displaced from the cavity, the wire-clearance recess being of sufficient size for receiving connections between hydrophone lead wires and the data-transmitting wires;
   c. a buoyant filler surrounding the cable, and separating the hydrophone housings; and
   d. an outer protective jacket surrounding the hydrophone housings and the buoyant filler.

5. The cable assembly of claim 1 wherein the buoyant filler substantially fills regions being bounded by an outermost cylindrical surface of the cable and an imaginary cylindrical surface which extends between outermost cylindrical surfaces of adjacent hydrophone housings.

6. The cable assembly of claim 1 wherein the protective jacket shields the cable assembly against penetration by water.

7. The cable assembly of claim 1, wherein the buoyant filler is a split tube which comprises a composite mixture of thermoplastic elastomer and glass microspheres, the composite mixture having a specific gravity of from 0.76 to 0.82.

8. The cable assembly of claim 1, wherein the protective jacket is a composite jacket comprising an internal layer of polyurethane and an external layer of polyvinyl chloride.

9. The cable assembly of claim 1, wherein each hydrophone housing further includes a first portion and a second portion, at least one of which having a receiving recess onto which the hydrophone module fastens, and wherein the first and the second portions each include a contact surface which contacts the cable when the first and second portions fasten around the cable.

10. The cable assembly of claim 9 wherein the first and second portions clamp around the cable via screws, and wherein the contact surface includes raised bosses which securely grip the cable by increasing contact pressure per unit area in a region of contact between the raised bosses and the cable.

11. The cable assembly of claim 9 wherein the portion which contains a receiving recess further includes a wire-clearance recess and a wire passageway between the receiving recess and the wire-clearance recess.

12. The cable assembly of claim 9, wherein a first outer cylindrical surface of each hydrophone module is flush with a second outer cylindrical surface of each hydrophone housing.

13. The cable assembly of claim 10, wherein a first outer cylindrical surface of each hydrophone module is flush with a second outer cylindrical surface of each hydrophone housing.

14. The cable assembly of claim 1, wherein the hydrophone module further includes:
   a. a cavity having a perimetrical edge which the intersection of the cavity and a receiving surface defines, the cavity receiving a hydrophone assembly;
   b. a gasket-receiving channel which circumscribes the perimetrical edge, the channel containing a gasket; and c. a cover which sealingly fits over the cavity and the channel.

15. The cable assembly of claim 14, wherein:

a. the cover is a metal plate;

b. the hydrophone assembly includes a hydrophone, lead wires and a baffle material;

c. the hydrophone is surrounded by the baffle material;

d. lead wires electrically connect to the hydrophone; and e. the hydrophone assembly is immersed in oil.

16. The cable assembly of claim 15, wherein the baffle material is an open cell foam structure.

17. The cable assembly of claim 1, wherein the hydrophone module further includes:

a. a cavity having a perimetrical edge which the intersection of the cavity and a receiving surface defines, the cavity receiving a hydrophone assembly; and b. a cover which sealingly fits over the cavity and the channel.

18. The cable assembly of claim 17, wherein the hydrophone assembly is potted within the cavity.

19. The cable assembly of claim 18, wherein the hydrophone assembly further includes a hydrophone frame which centers the hydrophone within the cavity.

20. A method of making a solid marine seismic cable assembly, comprising the steps of:

a. enclosing data-transmitting wires with a protective sheath, thus creating a cable;

b. affixing hydrophone housings along the cable, each housing including a mount having within itself
   i. a cavity containing a hydrophone and
   ii. a wire-clearance recess laterally displaced from the cavity and of sufficient size to receive connections between hydrophone lead wires and the data-transmitting wires; and c. connecting, within the wire-clearance recess, the hydrophone lead wires to the appropriate data-transmitting wires.

* * * * *